(12) United States Patent
Mori et al.

(10) Patent No.: US 7,600,624 B2
(45) Date of Patent: Oct. 13, 2009

(54) POWER TRANSMISSION APPARATUS

(75) Inventors: Katsuaki Mori, Shizuoka (JP); Yukio Nishide, Shizuoka (JP); Masaaki Kobayashi, Shizuoka (JP)

(73) Assignee: Kabushiki Kaisha F.C.C. (JP)

( * ) Notice: Subject to any disclaimer, the term of this patent is extended or adjusted under 35 U.S.C. 154(b) by 428 days.

(21) Appl. No.: 11/546,502

(22) Filed: Oct. 11, 2006

(65) Prior Publication Data

US 2008/0087517 A1   Apr. 17, 2008

(51) Int. Cl.
*F16D 25/00* (2006.01)
(52) U.S. Cl. .............. 192/87.15; 192/87.11; 192/87.14
(58) Field of Classification Search .............. 192/87.11, 192/87.14, 87.15
See application file for complete search history.

(56) References Cited

U.S. PATENT DOCUMENTS

| | | | |
|---|---|---|---|
| 3,566,707 A | 3/1971 | Schulz | |
| 6,520,041 B2 * | 2/2003 | Tokuda et al. | 74/359 |
| 7,246,692 B2 * | 7/2007 | Braford | 192/87.11 |
| 2003/0066728 A1 | 4/2003 | Hirt | |
| 2005/0082136 A1 * | 4/2005 | Braford et al. | 192/48.91 |
| 2005/0252749 A1 | 11/2005 | Janson | |

FOREIGN PATENT DOCUMENTS

| | | |
|---|---|---|
| DE | 35 08 375 | 11/1985 |
| DE | 101 46 837 | 5/2002 |
| EP | 1 195 537 | 4/2002 |

* cited by examiner

*Primary Examiner*—David D. Le
(74) *Attorney, Agent, or Firm*—Harness, Dickey & Pierce, P.L.C.

(57) ABSTRACT

A power transmission apparatus has an input member rotated by an engine output. First and second clutch sections, respectively, have a plurality of driving clutch discs and a plurality of driven clutch discs. Each driving and driven clutch disc being alternately arranged. First and second output shafts are rotated by driving force transmitted from the first and second clutch sections. Transmission members transmit the driving force from the first and second clutch sections, respectively, to the first and second output shafts. A selecting mechanism selectively presses or separates the driving clutch discs and driven clutch discs, respectively, of the first and second clutch sections against each other. The first and second clutch sections are coaxially arranged with the first and second shafts. The transmission members extend from either side of a group of the first and second clutch sections to the first and second output shafts. The selecting mechanism is arranged between the transmission members.

6 Claims, 2 Drawing Sheets

POWER TRANSMISSION APPARATUS

FIELD

The present disclosure relates to a power transmission apparatus with two clutch sections which comprise a first and second clutch section.

BACKGROUND

The power transmission apparatus which selectively connects and cuts the driving force (output) of an engine to the wheels of the vehicle, includes a manual transmission (MT) and an automatic transmission (AT), using a torque converter. Although the AT is easy for shifting operation, it has a disadvantage that it is less responsive. On the other hand, the MT has a disadvantage of a large shock during speed changes although it has a good response.

In view of reducing the shock during speed changes and to improve the response, a power transmission apparatus provided with a plurality of clutch sections, has been developed (see Europe Patent Publication No. 1195537 Specification). The power transmission apparatus of the prior art includes an input member rotated by the output of an engine, two clutch sections of a multi-disc type, transmission members extending from outside of the two clutch sections and connected to output shafts, and a selecting mechanism controlled by hydraulics to press and separate a plurality of clutch discs of each clutch section.

In this power transmission apparatus, it is possible to carry out the speed change operation (speed change by a transmission of vehicle), corresponding to its output shaft with the driving force of the input shaft being selectively transmitted via the transmission member corresponding to the clutch section, when any one of the clutch sections is selectively actuated. Such a power transmission apparatus can perform the automatic switching control of the clutch sections in accordance with the velocity of the vehicle and also perform the automatic speed change operation without causing a conspicuous shock in the speed change.

However, in the power transmission apparatus of the prior art, since the transmission members extend from radially outside of the two clutch sections and are connected to the output shafts arranged at the center of the apparatus, the transmission members are arranged so that they cover the clutch sections and the selecting mechanism etc. Thus, the heat radiation from the clutch sections, selecting members, etc. tends to be obstructed. In addition, since one transmission member is formed so that it covers the other transmission member, the size of the clutch discs (driving clutch discs and driven clutch discs) in the clutch sections is differentiated. This makes it difficult to use common parts in the apparatus. Furthermore, since the input means extends from radially outward to radially inward of the power transmission apparatus to form a power transmission path, the structure that includes the selecting mechanism becomes complicated.

SUMMARY

It is, therefore, an object of the disclosure to provide a power transmission apparatus with a structure that improves heat radiation. Also, it provides clutch discs of the same configuration in two clutch sections to enable common use in the clutch sections. Also, it provides a simple structure with a simple power transmission path.

According to the present disclosure, a power transmission apparatus comprises an input member rotated by an engine output. First and second clutch sections, respectively, have a plurality of driving clutch discs and a plurality of driven clutch discs. Each driving and driven clutch discs is alternately arranged. First and second output shafts are rotated by a driving force transmitted from the first and second clutch section. Transmission members transmit the driving force, transmitted from the first and second clutch sections, respectively, to the first and second output shafts. A selecting mechanism selectively presses or separates the driving clutch discs and driven clutch discs from each other, respectively, of the first and second clutch sections. The first and second output shafts extend substantially parallel with each other radially inside the input member. The driving force is selectively transmitted from the input member to the first and second output shafts in accordance with the pressing or separating operation of the selecting mechanism against the driving clutch discs and the driven clutch discs of the first and second clutch sections. The first and second clutch sections are arranged axially parallel with the first and second shafts. The transmission members extend from either side of a group of the first and second clutch sections to the first and second output shafts. The selecting mechanism is arranged between the transmission members.

According to the present disclosure, the power transmission apparatus above is further provided with the selecting mechanism comprising first and second pressing members, a central wall and an urging mechanism. The first and second pressing members press the driving clutch discs and the driven clutch discs of the first and second clutch sections against each other. The urging mechanism urges the first and second pressing members toward the central wall. The driving clutch discs and the driven clutch discs of the first and second clutch sections are pressed against each other by axially sliding the first and second pressing members against the urging force of the urging mechanism. Actuating oil is introduced into spaces between the central wall and the first pressing member or the second pressing member.

Since the transmission members extend from the first and second output shafts at either side of a group of the first and second clutch sections, it is possible to lay open the radially outer portions, the first and second clutch sections, to improve the heat radiation. Also, it is possible to arrange the clutch discs of the same configuration into two clutch sections. This enables common use of the clutch discs in the two clutch sections. In addition, since the driving force can be transmitted from the input, which is positioned radially outward to the radially inward output shafts, it is possible to have a simple structure and a simplified power transmitting path. Furthermore, since the transmission members extend from either side of a group of the first and second clutch sections to the first and second output shafts, and the selecting mechanism is arranged between the transmission members, it is possible to further simplify the structure of the apparatus. Also, it is possible to improve assembling efficiency by previously integrating the selecting mechanism between the first and second clutch sections.

Since the driving clutch discs and the driven clutch discs of the first and second clutch sections are pressed against each other by axially sliding the first and second pressing members against the urging force of the urging mechanism while introducing actuating oil into spaces between the central wall and the first pressing member or the second pressing member, it is possible to form a wall bearing the pressure of the actuating oil by only one central wall. Thus, it is possible to simplify the structure of the selecting mechanism.

Further areas of applicability will become apparent from the description provided herein. It should be understood that the description and specific examples are intended for purposes of illustration only and are not intended to limit the scope of the present disclosure.

DRAWINGS

Additional advantages and features of the present invention will become apparent from the subsequent description and the appended claims, taken in conjunction with the accompanying drawings, wherein:

DETAILED DESCRIPTION

A preferred embodiment of the present disclosure will be described with reference to the drawings.

Figure 1:
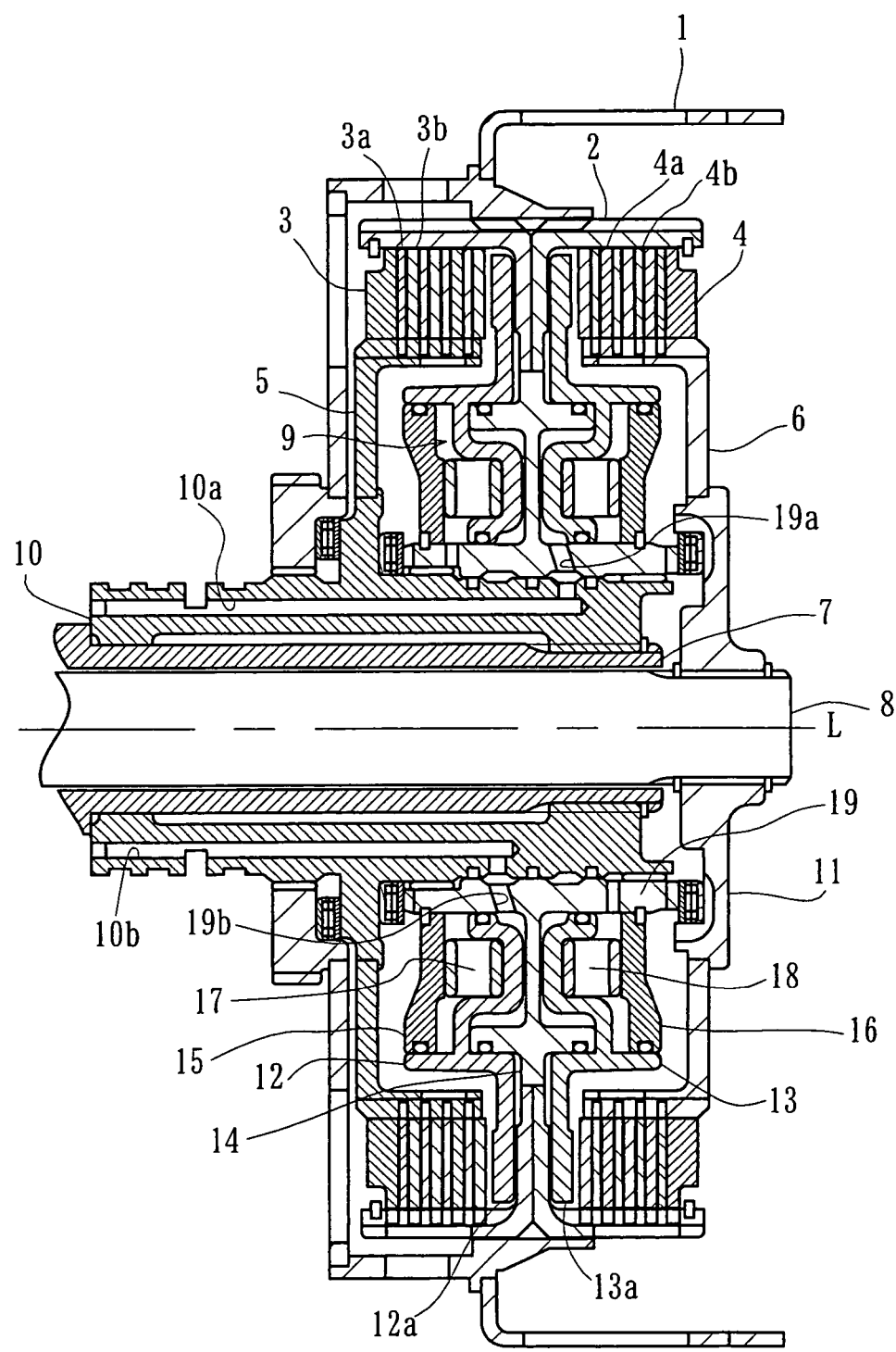
FIG. 1 is a longitudinal section view of a power transmission apparatus.
Figure 2:
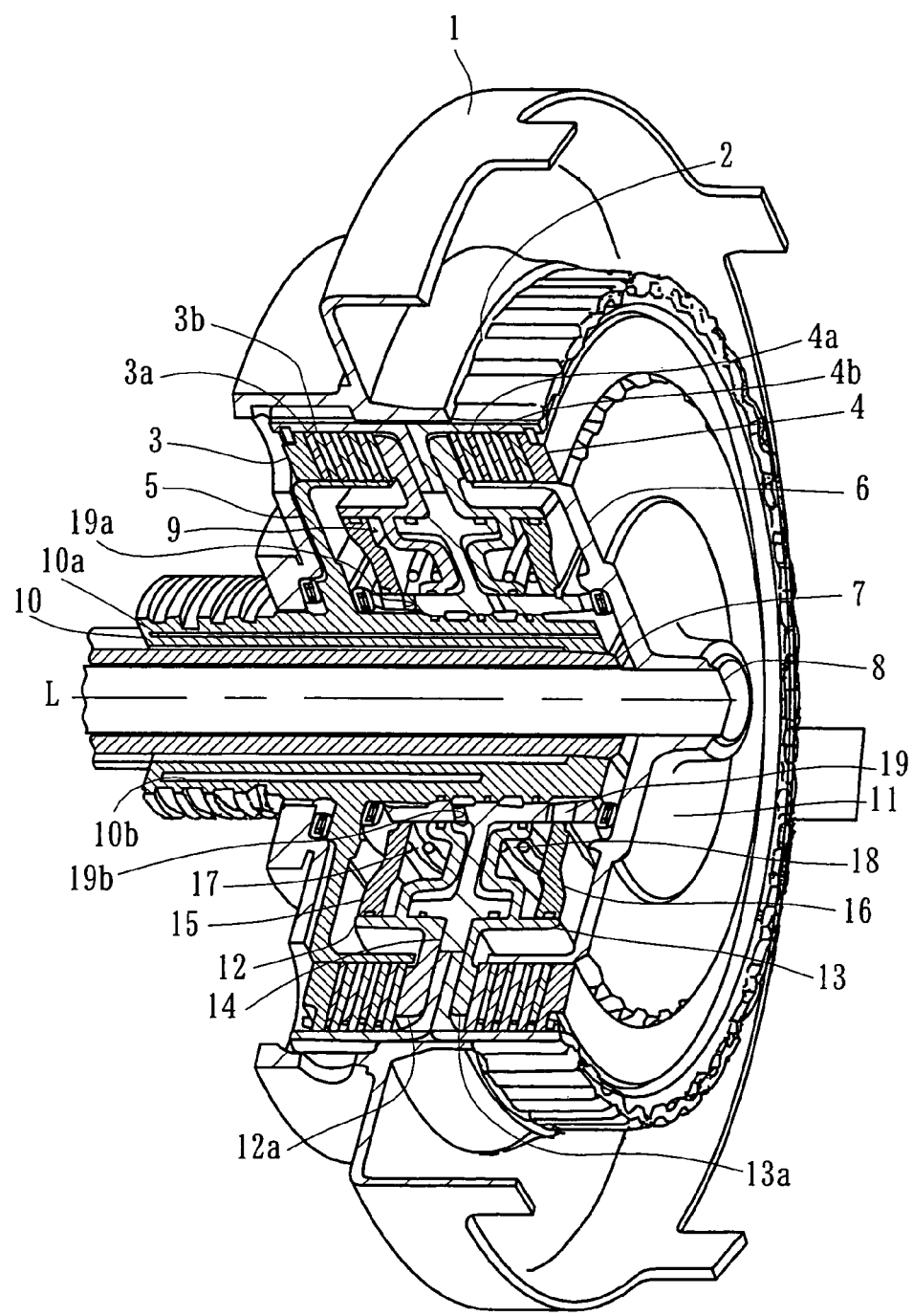
FIG. 2 is a partially in cross-section broken away perspective view of the power transmission apparatus of FIG. 1.

A power transmission apparatus is a combination of a vehicle starting clutch and a speed change clutch used to transmit a driving force (output) of an engine of the vehicle to its driving wheels. As shown in FIGS. 1 and 2, the power transmission apparatus includes a driving plate 1 and a guiding plate 2 which form an input member. A first clutch section 3 has driving clutch discs 3a and driven clutch discs 3b. A second clutch section 4 has driving clutch discs 4a and driven clutch discs 4b. Also, it includes transmission members 5, 6, a first output shaft 7, a second output shaft 8, a selecting mechanism 9, and interlocking members 10, 11.

The driving plate 1 and the guiding plate 2 are integrally connected to each other via tooth fitting or welding and can be rotated by a driving force of an engine (not shown) of a vehicle around a longitudinal axis "L". The plurality of driving clutch discs 3a, 4a, respectively, of the first clutch section 3 and the second clutch section 4 are arranged radially inside of the guiding plate 2. The driving clutch discs 3a, 4a slide in a right and left direction along the axis "L".

The plurality of driven clutch discs 3b, 4b, respectively, of the first clutch section 3 and the second clutch section 4 are arranged radially outside of the transmission members 5, 6. Thus, they can slide in a right and left direction along the axis "L". The driving clutch discs 3a, (4a) and the driven clutch discs 3b, (4b) are alternately arranged with respect to each other in a laminated fashion. Accordingly, mutually adjacent driving clutch discs 3a, (4a) and driven clutch discs 3b, (4b) can be pressed and separated against each other. In this specification, the term "separate" means not only a physical separation but a substantial separation, a condition released from the pressed condition. That is, the driving force of the guiding plate 2 can be transmitted to the transmission member 5 or 6 in the pressed condition. On the other hand, transmission of the driving force of the guiding plate 2 cannot be transmitted to the transmission member 5 or 6 in the separated condition.

The first clutch section 3, with driving clutch discs 3a and driven clutch discs 3b, and the second clutch section 4, with driving clutch discs 4a and driven clutch discs 4b, are arranged along the axis "L" of the first and second output shafts 7, 8. The transmission members 5, 6 extend radially outwardly from the first and second output shafts 7, 8 at either side of a group of the first and second clutch sections.

As shown in FIG. 1, the transmission member 5 extends from the left end of the first clutch section 3 radially inward toward the output shafts. The transmission member 6 extends from the right end of the second clutch section 4 radially inward toward the output shafts. In addition, the radially innermost end of the transmission member 5 is connected to the interlocking member 10 and is rotatable around the axis "L" interlocking with the transmission member 5. The radially innermost end of the transmission member 6 is connected to the interlocking member 11 and is rotatable around the axis "L" interlocking with the transmission member 6. The interlocking member 10 is formed with oil passages 10a, 10b to supply actuating oil to the selecting mechanism 9.

The first output shaft 7 comprises a cylindrical tubular member extending along the axis "L". The second output shaft 8, being a solid cylindrical member, is contained within the tubular first output shaft 7. The first output shaft 7 and the second output shaft 8 are adapted to be independently rotated with respect to each other. The first and second output shafts 7, 8 are spline-fitted, respectively, to the interlocking members 10, 11. Accordingly, the rotational force of the transmission member 5 is transmitted to the first output shaft 7 via the interlocking member 10. The rotational force of the transmission member 6 is similarly transmitted to the second output shaft 8 via the interlocking member 11.

The selecting mechanism 9 is arranged between the transmission members 5, 6. The selecting mechanism has the function of selectively pressing or separating the driving clutch discs 3a, 4a and the driven clutch discs 3b, 4b of the first and section clutch sections 3, 4. The selecting mechanism 9 includes a first pressing member 12, a second pressing member 13, a central wall 14, side walls 15, 16, leaf springs 17, 18 which form an urging mechanism, and a guiding member 19.

The first pressing member 12 has a pressing portion 12a arranged near the right end of the first clutch section 3. The first pressing member 12 is adapted to be slid in a left/right direction along the axis "L". The first pressing member is guided by the guiding member 19 and the radially outermost end of the side wall 15 to press or separate the driving clutch discs 3a and the driven clutch discs 3b of the first clutch section 3. The driving and driven clutch discs 3a, 3b are pressed against each other by the pressing portion 12a when the first pressing member 12 slides toward the left direction. Contrary, the driving and driven clutch discs 3a, 3b are released from the pressed condition when the first pressing member 12 slides toward the right direction.

Similarly, the second pressing member 13 has a pressing portion 13a arranged near the left end of the second clutch section 4. The second pressing member 13 is adapted to be slid in a left/right direction along the axis "L". The second pressing member 13 is guided by the guiding member 19 and the radially outermost end of the side wall 16 to press or separate the driving clutch discs 4a and the driven clutch discs 4b of the second clutch section 4.

The central wall 14 is positioned between the first and second pressing members 12, 13. The central wall 14 separates the sliding space (actuating chamber) of the first pressing member 12 and the sliding space (actuating chamber) of the second pressing member 13 from each other.

The leaf springs 17, 18 are arranged between the first pressing member 12 and the side wall 15 and between the second pressing member 13 and the side wall 16, respectively. The leaf springs 17, 18 urge the first and second pressing members 12,13 toward the central wall 14. The guiding member 19 is formed with oil passages 19a, 19b, respectively, communicating with the oil passages 10a, 10b of the interlocking members 10, 11.

When the actuating oil is supplied to the oil passage 10a, the actuating oil flows into the first pressing member actuating chamber, between the central wall 14 and the first pressing member 12. Thus, the first pressing member 12 is slid by the actuating oil toward the left direction against the urging force of the leaf spring 17. This presses the driving clutch discs 3a and the driven clutch discs 3b of the first clutch section 3 against each other. When the supply of the actuating oil is stopped, the first pressing member 12 will return to its original position by the urging force of the leaf spring 17. Thus, the pressurized contact is released between the driving clutch discs 3a and the driven clutch discs 3b.

Similarly, when the actuating oil is supplied to the oil passage 10b, the actuating oil will flow into the second pressing member actuating chamber, between the central wall 14 and the second pressing member 13. Thus, the second pressing member 13 is slid by the actuating oil toward the right direction against the urging force of the leaf spring 18. This presses the driving clutch discs 4a and the driven clutch discs 4b of the second clutch section 4 against each other. When the supply of the actuating oil is stopped, the second pressing member 13 will be returned to its original position, by the urging force of the leaf spring 18. Thus, the pressurized contact is released between the driving clutch discs 4a and the driven clutch discs 4b.

Accordingly, the first clutch section 3 and the second clutch section 4 can be selectively actuated, connected and disconnected by the driving force, at any time by selectively supplying the actuating oil to either one of the oil passages 10a or 10b. Thus, the driving force (output) of the engine inputted to the driving plate 1 and the guiding plate 2 is transmitted to the transmission member 5 and the interlocking member 10, by supplying the actuating oil to the oil passage 10a, via the first clutch section 3, and rotates the first output shaft 7. On the other hand, the driving force (output) of the engine inputted to the driving plate 1 and the guiding plate 2 is transmitted to the transmission member 6 and the interlocking member 11 by supplying the actuating oil to the oil passage 10b, via the second clutch section 4, and rotates the second output shaft 8. Accordingly, the driving force of the engine can be selectively transmitted to either one of the first and second output shafts 7, 8.

The first output shaft 7 and the second output shaft 8 can be connected, respectively, to even number stages and odd number stages of a transmission of a vehicle to perform a smooth speed change by connecting one output shaft to one stage, output path in the transmission, while power transmission is carried out via the other output shaft. Thus, the power transmission apparatus of the present disclosure can perform the automatic switching control of the clutch sections, by selective supply of actuating oil to either one of the oil passages 10a, 10b, in accordance with the velocity of vehicle to achieve the automatic speed change operation without causing a conspicuous speed shock change.

According to a preferred embodiment, since the transmission members 5, 6 extend from radially inside of the clutch group, first clutch section 3 and second clutch section 4, to the first and second output shafts 7, 8 at either side of the clutch group, it is possible to open the radially outer portion and portions of the driving and driven clutch discs 3a, 4a; 3b, 4b, of the clutch group to atmosphere to improve heat radiation. Thus, the power transmission apparatus can achieve remarkably improved heat radiation as compared with power transmission apparatus of the prior art where the transmission members extend from a radially outward position of the clutch group to the output shafts in such a manner so that they cover the clutch group.

From the structure of the power transmission apparatus described above, it is possible to use clutch discs, driving clutch discs 3a, 4a and driven clutch discs 3b, 4b, of the first and second clutch members 3, 4 which have substantially the same configuration, especially the diameter of clutch discs.

Thus, this enables common use of the clutch discs in the two clutch sections. Accordingly, it is possible to achieve easy administration of parts in the manufacturing steps and thus to reduce the manufacturing cost.

In addition, since the driving force can be transmitted from the input position radially outward of the radially inward output shafts, it is possible to have a simple structure that simplifies the power transmitting path. Furthermore, since the transmission members 5, 6 extend from either side of a group of the first and second clutch sections to the first and second output shafts 7, 8, and the selecting mechanism 9 is arranged between the transmission members 5, 6, it is possible to further simplify the structure of the apparatus. Also, it is possible to improve assembling efficiency by previously integrating the selecting mechanism between the first and second clutch sections.

According to the preferred embodiment, since the driving clutch discs 3a, 4a and the driven clutch discs 3b, 4b of the first and second clutch sections 3, 4 are pressed against each other by axially sliding the first and second pressing members 12, 13 against the urging force of the springs by introducing actuating oil into spaces between the central wall 14 and the first pressing member 12 or the second pressing member 13, it is possible to form one central wall 14 that bears the pressure of the actuating oil. Thus, this simplifies the structure of the selecting mechanism 9.

The disclosure has been described with reference to the preferred embodiment. Obviously, modifications and alternations will occur to those of ordinary skill in the art upon reading and understanding the preceding detailed description. For example, it is possible to replace the selecting mechanism 9 actuated by oil with other means which can selectively press and separate the driving clutch discs 3a, 4a and driven clutch discs 3b, 4b of the first and second clutch sections 3, 4. In addition it is possible to replace the leaf springs 17, 18 in the selecting mechanism 9 with other mechanisms that urge the first and second pressing members 12, 13 toward the central wall 14.

The power transmission apparatus can be applied to those apparatus having differences in configurations of external appearance and structural parts; those apparatus having additional functions, if they have features where the first and second clutch sections are arranged axially in parallel with the first and second shafts; where the transmission members extend from either side of a group of the first and second clutch sections to the first and second output shafts; and where the selecting mechanism is arranged between the transmission members.

What is claimed is:

1. A power transmission apparatus comprising:
   an input member rotated by an engine output;
   first and second clutch sections each having a plurality of driving clutch discs and a plurality of driven clutch discs, each driving and driven clutch discs being alternately arranged;
   first and second output shafts rotated by a driving force transmitted from the first and second clutch sections;
   transmission members for transmitting the driving force transmitted from the first and second clutch sections, respectively, to the first and second output shafts;
   selecting mechanism for selectively pressing or separating the driving clutch discs and driven clutch discs, respectively, of the first and second clutch sections against each other;
   the first and second output shafts extending substantially coaxially with each other and positioned radially inside the input member and selectively transmitting the driving force from the input member to the first and second output shafts in accordance with the pressing or separating operation of the selecting mechanism against the driving clutch discs and the driven clutch discs of the first and second clutch sections;

the first and second clutch sections are coaxially arranged with the first and second output shafts, the transmission members extend from either side of a group of the first and second clutch sections to the first and second output shafts such that said transmission member extends from opposing sides of said first and second clutch sections, and the selecting mechanism is arranged between the transmission members and is arranged radially inward from the first and second clutch sections.

2. The power transmission apparatus of claim 1 wherein the first output shaft and the second output shaft are connected, respectively, to even number stages and odd number stages of a transmission of a vehicle.

3. The power transmission apparatus of claim 1 wherein the selecting mechanism comprises first and second pressing members for pressing the driving clutch discs and the driven clutch discs of the first and second clutch sections against each other; a central wall; an urging mechanism for urging the first and second pressing members toward the central wall; the driving clutch discs and the driven clutch discs of the first and second clutch sections are pressed against each other by axially sliding the first and second pressing members against the urging force of the urging mechanism and oil passages are connected to the selecting mechanism via said first and second output shafts for introducing actuating oil into spaces between the central wall and the first pressing member or the second pressing member.

4. The power transmission apparatus of claim 3 further comprising a guiding member and side walls forming an actuating chamber for sliding the first and second pressing members; and the first and second pressing members are guided by the guiding member and end faces of the side walls.

5. The power transmission apparatus of claim 3 wherein the urging mechanism is arranged between the first pressing member and the side wall and between the second pressing member and the side wall so as to urge the first and second pressing members toward the central wall.

6. The power transmission apparatus of claim 3 wherein the urging mechanism comprises a leaf spring.

* * * * *

UNITED STATES PATENT AND TRADEMARK OFFICE
CERTIFICATE OF CORRECTION

PATENT NO. : 7,600,624 B2 Page 1 of 1
APPLICATION NO. : 11/546502
DATED : October 13, 2009
INVENTOR(S) : Mori et al.

It is certified that error appears in the above-identified patent and that said Letters Patent is hereby corrected as shown below:

Column 4, line 43,
"13$a$arranged" should be --13$a$ arranged--

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,600,624 B2 Page 1 of 1
APPLICATION NO. : 11/546502
DATED : October 13, 2009
INVENTOR(S) : Mori et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 430 days.

Signed and Sealed this

Fifth Day of October, 2010

David J. Kappos
*Director of the United States Patent and Trademark Office*